United States Patent
Stählin et al.

(10) Patent No.: US 9,733,085 B2
(45) Date of Patent: Aug. 15, 2017

(54) SYSTEM AND METHOD FOR UPDATING A DIGITAL MAP IN A DRIVER ASSISTANCE SYSTEM

(71) Applicants: Ulrich Stählin, Eschborn (DE); Alfred Eckert, Mainz-Hechtsheim (DE)

(72) Inventors: Ulrich Stählin, Eschborn (DE); Alfred Eckert, Mainz-Hechtsheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/946,809

(22) Filed: Jul. 19, 2013

(65) Prior Publication Data
US 2014/0025292 A1    Jan. 23, 2014

(30) Foreign Application Priority Data

Jul. 19, 2012  (DE) .................. 10 2012 212 740

(51) Int. Cl.
*G01C 21/28* (2006.01)
*G01C 21/00* (2006.01)
*G01C 21/32* (2006.01)

(52) U.S. Cl.
CPC ........... *G01C 21/00* (2013.01); *G01C 21/32* (2013.01)

(58) Field of Classification Search
None
See application file for complete search history.

(56) References Cited

U.S. PATENT DOCUMENTS

| | | | |
|---|---|---|---|
| 6,734,873 B1* | 5/2004 | Herf et al. .................... 345/629 |
| 7,904,240 B2* | 3/2011 | Nortrup ............. G01C 21/3667 |
| | | | 701/465 |
| 2001/0029425 A1* | 10/2001 | Myr .................... G01C 21/3492 |
| | | | 701/117 |
| 2004/0246147 A1* | 12/2004 | von Grabe ......... G01C 21/3492 |
| | | | 340/995.13 |
| 2005/0080850 A1* | 4/2005 | Salesky et al. ............... 709/204 |
| 2005/0212806 A1* | 9/2005 | Koselj et al. ................. 345/522 |
| 2006/0058950 A1* | 3/2006 | Kato ...................... B60R 11/04 |
| | | | 701/409 |

(Continued)

FOREIGN PATENT DOCUMENTS

| | | |
|---|---|---|
| DE | 10 2008 012 661 A1 | 2/2009 |
| DE | 10 2008 046 683 A1 | 3/2009 |

(Continued)

*Primary Examiner* — Truc M Do
*Assistant Examiner* — Jess Whittington
(74) *Attorney, Agent, or Firm* — Cozen O'Connor (57) ABSTRACT

A system and method for updating a digital map for a driver assistance system in a vehicle. The digital map contains map data having coordinates and attributes for characterizing subregions of an overall region of the digital map. The system includes a base station and a plurality of vehicles, each equipped with a driver assistance system. The base station has at least one transmission unit for sending updated map data having updated attributes to the driver assistance systems. The driver assistance system has a memory unit for storing map data from at least a portion of the digital map, a receiver unit for receiving the updated map data sent by the base station and a control unit for updating the stored map data using the received updated map data.

10 Claims, 2 Drawing Sheets

(56) References Cited

U.S. PATENT DOCUMENTS

| | | | |
|---|---|---|---|
| 2006/0082472 A1* | 4/2006 | Adachi | G08G 1/096716 340/995.13 |
| 2007/0143017 A1* | 6/2007 | Reich | G01C 21/26 701/469 |
| 2008/0255754 A1* | 10/2008 | Pinto | G01C 21/3691 701/119 |
| 2008/0303693 A1* | 12/2008 | Link, II | G08G 1/096741 340/905 |
| 2009/0082917 A1* | 3/2009 | Adachi | G08G 1/0104 701/420 |
| 2009/0128483 A1* | 5/2009 | Robbins et al. | 345/156 |
| 2009/0150457 A1 | 6/2009 | Nakamura et al. | |
| 2009/0265105 A1* | 10/2009 | Davis | G01C 21/20 701/300 |
| 2010/0020093 A1* | 1/2010 | Stroila | G01C 21/20 345/589 |
| 2010/0211304 A1* | 8/2010 | Hwang | G01C 21/3484 701/532 |
| 2010/0217455 A1 | 8/2010 | Stählin et al. | |
| 2010/0241354 A1* | 9/2010 | Stahlin | B60W 40/02 701/532 |
| 2010/0299058 A1* | 11/2010 | Nortrup | 701/200 |
| 2011/0047338 A1* | 2/2011 | Stahlin | G01C 21/28 711/154 |
| 2011/0054716 A1* | 3/2011 | Stahlin | G01C 21/28 701/1 |
| 2011/0125401 A1 | 5/2011 | Stählin | |
| 2011/0313633 A1* | 12/2011 | Nath | G08G 1/163 701/70 |
| 2012/0010764 A1 | 1/2012 | Hamada | |
| 2013/0238439 A1* | 9/2013 | Chatterjee et al. | 705/14.62 |

FOREIGN PATENT DOCUMENTS

| | | |
|---|---|---|
| DE | 10 2008 053 531 A1 | 5/2009 |
| DE | 10 2009 008 959 A1 | 9/2009 |
| DE | 11 2009 004 558 T5 | 9/2012 |
| WO | WO 2009/133185 A1 | 11/2009 |

\* cited by examiner

FIG 2

SYSTEM AND METHOD FOR UPDATING A DIGITAL MAP IN A DRIVER ASSISTANCE SYSTEM

BACKGROUND

1. Field of the Invention

The invention relates to a system and method for updating a digital map for a driver assistance system in a vehicle.

2. Related Art

Driver assistance systems are used for assisting a driver in driving a vehicle, particularly for increasing driving convenience and for easing the burden on the driver, for example by performing navigation functions. In this case, it is possible for the driver assistance system to control the vehicle to some extent or else completely automatically, which is sometimes called semi-automated or highly automated driving. In the text which follows, driver assistance systems are also intended to be understood to mean such systems as are used to improve road safety, that is to say that contribute to preventing traffic accidents or, in the event of a traffic accident, to limiting personal injury and material damage as much as possible.

To perform these tasks, driver assistance systems access digital maps. Digital maps depict a physical region of space (usually part of the Earth's surface), subsequently also called the overall region, and contain map data for characterizing subregions of this overall region. The subregions may be defined by means of a regular or random grid. Each of these subregions has precisely one associated information unit in the digital map, that is to say precisely one map data item. Each map data item comprises the respective coordinates of the associated subregion and also attributes that contain information about this subregion. Thus, the attributes of a digital map contain lane and direction information for the roads in a road system and also the names of the roads, inter alia, for navigation functions. By way of example, the coordinates used for a subregion may be the coordinates of the physical center of the subregion or of another point within the subregion if the subregions are larger than permitted, in principle, via the physical resolution of the digital map.

For purposeful access to the information stored in the digital map, a vehicle furthermore has a position-finding unit (GPS or the like), for example a satellite navigation receiver, which can be used to ascertain a current position, that is to say current coordinates, of the vehicle. These coordinates can be used by the driver assistance system to read information from the digital map about the current surroundings of the vehicle and to subsequently use said information for performing its functions.

In this case, as the complexity of the functions of a driver assistance system increases, so too do the demands on the digital map that the driver assistance system accesses for performing these functions. In particular, there is an increase in the demands on the currentness of the information that the digital map contains and also on the volume, precision and also the type of this information.

SUMMARY OF THE INVENTION

An object of the present invention is a system for updating a digital map for a driver assistance system in a vehicle that solves or at least alleviates the problems of the prior art that are outlined above. In particular, the proposed system is intended to allow the information that the digital map contains to be kept as current as possible, this information intended to allow a driver assistance system to perform complex and safety-critical functions as far as possible.

The proposed system comprises a base station and a plurality of vehicles that are each equipped with a driver assistance system. Each of the driver assistance systems comprises a memory unit for storing map data for at least one portion of a digital map. As already described at the outset, the digital map contains map data characterizing subregions of an overall region depicted by the digital map. In this case, the digital map contains, for each of these subregions, precisely one map data item that comprises coordinates for this subregion and also one or more attributes that characterize this subregion in more detail, said attributes being able to have any format, that is to say being able to be provided by numbers, letters, Boolean operators, etc. By way of example, the subregions may be defined by uniform or nonuniform rasterization of the overall region. Depending on the resolution of the digital map, they may be just one square meter or else 10 square kilometers, for example, in size. By way of example, the subregions may also be defined as sections or lane sections of a traffic network, for example with a length of just one meter in each case, or else greater lengths, for example a length of 10 kilometers.

The base station comprises at least one transmission unit, preferably a multiplicity of transmission units, which are distributed over the overall region, for sending updated map data for the digital map to the driver assistance systems. In this case, the updated map data comprise not only the coordinates but also, particularly, updated attributes, the production of which is described further below.

Each of the driver assistance systems comprises a receiver unit for receiving the updated map data sent by the base station and a control unit for updating the stored map data by using the received updated map data. In the simplest case, the control unit may be set up to replace the stored map data with the updated map data received from the base station completely or in part, i.e. to override the map data with said updated map data, or to add the updated map data to the stored map data.

Furthermore, each of the driver assistance systems has a position-finding unit for ascertaining current coordinates of the vehicle. These coordinates define the current position of the vehicle. The position-finding unit may be a navigation receiver for receiving locating signals from satellites (for example GPS, Galileo, GLONASS, COMPASS, IRNSS, etc.), from WLAN systems, and/or from cellular radio systems, or from other locating signal transmitters, for example.

Furthermore, each of the driver assistance systems comprises a transmission unit for sending the current coordinates and possibly also for sending further data produced by the driver assistance system, such as measuring data from ambient sensors or other sensor systems, as are described below, to the base station. The control unit is accordingly set up to actuate the transmission unit to send the coordinates and possibly further data produced by the respective vehicle or driver assistance system to the base station.

By way of example, such actuation can take place at regular intervals of time, these intervals of time possibly being in a range from 1 second to 10 seconds, for example. It is additionally or alternatively also possible for this actuation always to take place as soon as the vehicle has moved by a particular distance, this distance possibly being in a range between 1 meter and 10 kilometers, for example. It is additionally or alternatively also possible for this actuation to take place automatically within each of the cited subregions at least once or in the event of significant changes to the sent data.

The base station comprises at least one receiver unit, preferably a multiplicity of receiver units, which are distributed over the overall region, for receiving the data sent by the vehicles (the coordinates and possibly further data, such as the measured values listed above and also below) and a memory unit for storing the received data from the vehicles. Typically, the vehicles in the system are recorded in the base station, for example a registration mark is stored in the memory unit for each of the vehicles. In that case, each of the vehicles recorded in this manner transmits an appropriate registration (counter)mark together with the current coordinates. However, it is also possible to use communication that, to protect privacy, does not require a registration mark at all or using pseudonymized, possibly changing registration numbers.

Furthermore, the base station comprises a computation unit that is set up to select, for each of the subregions of the overall region, those of the stored coordinates of the vehicles that are associated with this subregion and to update the attributes of the subregion (and hence the map data item from this subregion) by using the coordinates selected in this manner. The coordinates are thus situated within the respective subregion and the coordinates of all the other subregions are at a greater interval from the coordinates of the coordinates selected in this manner. Furthermore, the computation unit may be set up also to use and to take into account the data transmitted by the driver assistance systems, in each case together with the coordinates, when updating the attributes. By way of example, this data may be measured variables from ambient sensors in the vehicles (see below), what are known as driving-dynamics measured variables from the vehicles (see below) and/or results from checks on the attributes of the digital maps (see below). This data are always transmitted together with those coordinates of the vehicle that were current at the time at which the measured values on which the data is based was captured. In this case, the driver assistance systems, particularly the control units thereof, are also set up to store the instantaneously current coordinates of the respective vehicle, and to associate them with the data, during the production or capture of the data, that is to say the measured values, for example, and to send the data together with these coordinates to the base station. The base station, that is to say particularly the computation unit, is then set up not only to select the coordinates received from the vehicles, as described above, when the attributes that the digital map contains for the subregions are updated, but also additionally to select the further data produced and transmitted together with these coordinates from the vehicles and likewise to take them into account when updating the map data.

In this way, the proposed system allows the digital map to be updated using the stored coordinates and possibly the cited further data from all the vehicles that the system contains centrally for all the vehicles. In this case, the number of (registered) vehicles that the system contains is theoretically unlimited in an upward direction. The advantages of the system even become greater the more vehicles the system contains i.e., registered, since as the number of vehicles in the system becomes greater so too does the volume of coordinates, and possibly further data for the vehicles, that are stored for each update to the map data. Firstly, the digital map can be updated particularly frequently at short intervals of time. By way of example, it is possible for the computation unit to be used to take the transmitted coordinates of the vehicles to quickly recognize current changes in the course of individual traffic routes and then to take them into account when updating the digital map. Furthermore, central processing of the data allows a particularly high level of data quality and data integrity to be attained. By way of example, the computation unit may be set up to validate the coordinates transmitted by the vehicles and possibly also the further data against one another and/or to process them further using statistical data evaluations. In particular, this allows individual data outliers to be easily identified as such.

The data is processed in a form weighted with a time-based oblivion factor, for example, that ensures that more recent data is used to a greater extent than older data when identifying a change.

By contrast, digital maps in conventional systems are transmitted to the driver assistance system by the manufacturer using a data storage medium or using a wired or wireless data interface and are updated possibly at a later time, without taking into account the measurements and "experience" by the driver assistance systems.

In addition to the position-finding unit, a plurality of or all the driver assistance systems may furthermore have ambient sensors for capturing measured variables or attributes that characterize the current surroundings of these vehicles. Examples of suitable ambient sensors are camera systems, radar sensors, lidar sensors, laser scan systems, ultrasound sensors, vehicle-to-X communication units (C2X), combinations thereof, and also driver observation cameras. Instead or in addition, it is also possible to use sensors for variables from the system's own vehicle, such as steering angle sensors, steering torque sensors, wheel speed sensors, acceleration sensors, rotation rate sensors, engine speed sensors, pedal position sensors, etc. By way of example, the ambient sensors and/or the sensors for the variables from the system's own vehicle, which are each connected to the control unit of the respective driver assistance system for the purpose of data transmission, can be used to capture and determine the current lane of the traffic route in which the vehicle is currently situated, or other attributes of this lane, such as the direction of travel, turn-off opportunities, the road surface, and/or the current (possibly weathering-dependent) state of the current traffic route. Furthermore, it is possible to capture the quality of driving, speed, acceleration behavior and/or tiredness condition of the driver, for example.

By way of example, the control units of a plurality of or all the driver assistance systems may be set up to use the current coordinates of the respective vehicle to check the map data stored for these coordinates of the vehicle, that is to say particularly the attributes of the digital map, and to send the result of this check together with the coordinates (that are current during the capture of the measured variables) to the base station. The computation unit of the base station is set up to take these results received from the driver assistance systems (for the checks on the attributes) into account for producing the updated attributes. In particular, provision may be made for the update to the relevant attributes to be initiated by the computation unit on condition that a minimum number of deviations above a prescribed threshold value has arisen during these checks.

As attribute(s), the map data item from each of the subregions of the overall region depicted by the digital map may contain at least one from the following group of possible attributes, for example:

association of the subregion with a traffic network, particularly a road network; association of the subregion with a traffic route in the traffic network, particularly a road;

association of the subregion with a traffic lane on the traffic route; curvature and/or curve of the traffic route, for example defined by the radius of curvature of the traffic route;

lane information from the traffic route, particularly lane direction, lane change options and/or turn-off options;

presence of an obstruction within the subregion, particularly presence of roadwork, closure, diversion, and/or a current deviation in the course of the traffic route from an original course of the traffic route; and/or type, nature and/or current state of the traffic route, particularly of a negotiable surface of the traffic route, for example asphalt, cobblestones, gravel, unsecured, wet, snow-covered, icy, etc.

These attributes are particularly attributes that can possibly be captured by the (ambient) sensors described above in the driver assistance systems and can therefore be checked by the driver assistance systems. Typically, these attributes are of topographic type and/or relate to the configuration and/or the current state of the traffic network. (The text below cites further examples of attributes that are based on what are known as driving-dynamics measured variables and can possibly be captured by further sensor systems in the driver assistance systems.)

By way of example, a check on an attribute that, by way of example, indicates whether a subregion of the map is associated with a road or a lane by a driver assistance system in a vehicle that is currently situated in this subregion can provide the result that the vehicle is currently situated in a particular lane or on a particular road (according to the measured values from an ambient sensor, for example a camera, or according to the measured values from a localization system on the basis of GNSS data, for example), but this does not match the attribute, from the digital map, that is stored for the current coordinates of the vehicle. It is also possible for a closure or roadworks recognized by ambient sensors to deviate from a corresponding (not current) attribute of the digital map. Such results are then sent to the base station, as described above. As soon as a particular minimum number of confirmations of these results has reached the base station, for example, the latter is able to perform an update on the relevant attributes.

By way of example, it is thus possible for the driver assistance system to check whether the vehicle is actually situated on the road that the digital map indicates as the current position of the vehicle. This is possible using the cited ambient sensors or by comparison with the received location information from the aforementioned navigation receiver, for example, as described. By way of example, it is possible for the method described in WO 2009/133185 A1 to be used in order to use the driver assistance system to recognize changes to the map in the system's own vehicle and then to send them directly to the base station as a necessary change. In addition, a change can be recognized by using a camera on the vehicle, for example, to recognize the current course of a lane and to compare it with the course of a lane from the map.

This requires sufficiently precise localization of the vehicle in order to allow identification, what is known as map matching, of the current position of the vehicle within the digital map and then association of the vehicle with a road. If the changes to the map that are recognized as being necessary are greater than the radius for the map matching described above, it is merely possible to recognize that the road on which the vehicle is currently traveling is thus not included in the map data. Whether this case involves a new road or a change to an existing road cannot be established in the system's own vehicle under these circumstances. However, it is also possible, as described above, for there to be provision for the change to be recognized on the basis of the position data only in the base station.

It is alternatively or additionally possible for a plurality of or each of the driver assistance systems to have, in addition to the position finding unit and possibly the ambient sensors described above, a respective further sensor system that is set up to capture at least one "driving-dynamics measured variable" from a vehicle and is connected to the driver assistance system of the vehicle in order to transmit the at least one driving-dynamics measured variable. A driving-dynamics measured variable from a (traveling) vehicle includes measured variables that characterize the current state of movement, the current operating point and/or the current operating state of the vehicle or portions of the vehicle (e.g. engine, gearbox, brake system, chassis, wheels).

By way of example, the at least one driving-dynamics measured variable from the vehicle, which can be captured by the sensor system of the vehicle, may be selected from the following group of driving-dynamics measured variables:

speed of the vehicle (longitudinal and/or transverse and/or vertical);

longitudinal acceleration of the vehicle;

transverse acceleration of the vehicle;

vertical acceleration of the vehicle;

rev counts for the engine and/or for one, a plurality of or all the wheels of the vehicle;

steering wheel angle and/or driver steering torque of the vehicle;

side slip angle of the vehicle;

yaw rate of the vehicle;

roll rate of the vehicle;

pitch rate of the vehicle;

slippage of the wheels of the vehicle;

coefficient of friction of the wheels of the vehicle; and/or energy consumption of the vehicle.

Each or a plurality of these driver assistance systems may be set up to send the at least one driving-dynamics measured variable together with the coordinates of the vehicle to the base station, wherein the computation unit of the base station may be set up to use the received driving-dynamics measured variables and the coordinates that are current during the capture of the measured variables of the vehicles for updating the attributes associated with the coordinates. In addition, the driving-dynamics variables can be used to improve the location information from the position-finding unit.

Alternatively or in addition, a plurality of or each of these driver assistance systems may also be set up to use the current driving-dynamics measured variables to independently check the stored attributes associated with the current coordinates of the respective vehicle and to send the result of this check to the base station. The computation unit of the base station is set up to take these results received from the vehicles (for these checks on the map data) into account, and to use them, when updating the attributes. In this case, as already described above, it is again possible for the update to the relevant attributes to be initiated by the computation unit on condition that a minimum number of deviations above a prescribed threshold value have arisen during these checks.

These driving-dynamics measured variables from the individual vehicles can be used as a basis for the computation unit of the base station to define and produce or calculate at least some of the attributes of the digital map. By way of example, provision may be made for the map data for each of the subregions to contain at least one, preferably a plurality of, attribute(s) characterizing this subregion from the following group:
- a statistical distribution function for one or more of the driving-dynamics measured variables of the vehicles in this subregion, particularly a speed distribution and/or acceleration distribution for the vehicles within the subregion;
- a statistical measured variable, derived from a statistical distribution function for one or more driving-dynamics measured variables of the vehicles in this subregion, such as the mean, the median, the standard deviation, the minimum and/or the maximum of the driving-dynamics measured variable or the correlation of the driving-dynamics measured variables, particularly an average speed of the vehicles within this subregion;
- a functional relationship between a plurality of the driving-dynamics measured variables, particularly between the speed and the transverse acceleration of the vehicle in this subregion;
- a typical driving style of the vehicles in this subregion, particularly a sporty driving style (for example existing in the case of great accelerations and/or speeds) or a uniform driving style (for example existing in the case of only small accelerations and moderate speeds); and or an average energy consumption of the vehicles within the subregion.

The computation unit of the base station is then set up to calculate this at least one attribute based on driving-dynamics measured values by using the driving-dynamics measured variables received from the vehicles, as indicated above, for each of the relevant subregions. In this case, the computation unit may be set up to compare the received driving-dynamics measured values with one another and in so doing to identify individual outliers. In the further calculation of the attributes, these outliers can be ignored and only the remainder of the measured values, which are therefore validated, can be used.

The driver assistance systems of the vehicles may be set up to send at least one feature characterizing a respective vehicle, for example from the group:
- vehicle type;
- vehicle weight;
- type of propulsion of the vehicle (drive axle, four-wheel drive);
- type of tires on the vehicle (e.g. winter tires or summer tires);
- type of motorization of the vehicle (e.g. energy type, performance, etc.); and/or
- average energy consumption of the vehicle, to the base station. The computation unit of the base station may then be set up to update the attributes of the digital map by taking these features characterizing the vehicles into account. In this case, energy is understood to mean both conventional fuel (petrol, diesel, ethanol) and electrical power from batteries or fuel cells, for example, and hydrogen and other modern energy sources.

By way of example, it is possible for the attributes of the map to be calculated or updated separately for different values of these vehicle features. By way of example, it is possible, when calculating the average coefficient of friction or the speed profile for a road section from the relevant measured values from the vehicles, to take the tires and/or the type of propulsion of the individual vehicles into account for the calculation.

Alternatively or in addition to the aforementioned features characterizing the vehicles, the update to the attributes of the digital map can also take into account features that characterize the drivers of the vehicles. By way of example, a plurality of or all of the driver assistance systems in the vehicles may be set up to send at least one feature characterizing the driver of the respective vehicle, for example from the group
- age of the driver;
- sex of the driver; and/or
- driving style of the driver (e.g. sporty, defensive, etc.), to the base station. The computation unit of the base station may then be set up to update the attributes by taking these features of the drivers into account.

By way of example, it is possible to take the driving style and/or the age of the drivers into account when calculating the speed distribution or the average energy consumption within the subregions (e.g. road sections). By way of example, it is possible to calculate specific speed distributions and fuel consumption means for different age groups and driving styles. It is furthermore possible for the computation unit of the base station to be set up to possibly individually determine the time of the update to each of the attributes of each of the subregions by the computation unit and to actuate the transmission unit of the base station to send these times together with the updated attributes to the driver assistance systems. The control units of the driver assistance systems may be set up to use these times, frequently also called time stamps for the attributes, to determine the currentness of the attributes and to take this currentness (or the currentness values) of the attributes as a basis for deciding whether the attributes are admissible for the use of particular driver assistance functions. By way of example, safety-critical functions may require greater currentness than less safety-critical functions.

The control units of a plurality of or each of the driver assistance systems may be set up to automatically determine the type, scope and/or time of the updated map data (attributes) required by the base station, for example by using the current coordinates of the vehicle, the features of the driver and/or the features of the vehicle, current driving-dynamics measured variables (such as the current speed of the vehicle), current measured values from the ambient sensors, the activated assistance functions and/or other inputs from the driver, and send an appropriate request signal to the base station. The computation unit of the base station is then set up to transmit the updated map data to the respective driver assistance systems by taking the request signals received from the driver assistance systems into account. By way of example, this allows a given vehicle to be sent only such map data as characterize direct surroundings of the vehicle, the radius of these surroundings being able to be determined on the basis of the current speed, for example.

Alternatively or in addition, the computation unit of the base station may be set up to select, for a plurality of or for each of the vehicles, the type, scope and/or time of the attributes suitable for the vehicle by using the current coordinates of the vehicle, the features of the driver, the features of the vehicle, the current driving-dynamics measured values from the sensor system and/or the current measured values from the ambient sensors, and/or other inputs from the driver and to send only these attributes to the vehicle.

The control units of the driver assistance system are furthermore set up to perform driver assistance functions by using the map data for the digital map, as described at the outset. The control units of a plurality of or all of the driver assistance systems may, by way of example, be set up to use the updated map data to transmit recommendations and/or warning messages (for example about excessive speed ahead of a curve) to the drivers of the vehicles and/or to automatically send appropriate control signals to controllable systems in the vehicle, such as to the brake system, the engine, the lighting system, the chassis, etc., and thus to actively engage in controlling the vehicle. In particular, it is possible for a driver assistance system in the system to control the vehicle to some extent or else completely automatically using the digital map (semi-automated or highly automated driving). In particular, a driver assistance system in the system may be set up, by way of example, to adapt the current speed of the vehicle to suit the value of the average speed that is entered in the digital map as an attribute for the current coordinates of the vehicle.

The control unit, the transmission unit, the reception unit, the memory unit, the position finding unit and possibly the ambient sensors and the sensor system in each of the driver assistance systems may naturally be integrated in a single compact unit or else may be provided by individual units that are connected to one another for the purpose of data transmission. Similarly, the computation unit of the base station may be integrated in a physically compact unit. Alternatively, it is possible for the computation unit to comprise a plurality of physically separate and networked computation units. By way of example, the computation unit may be integrated in the internet or another computer network. The cited reception units and transmission units of the driver assistance system and the base station may each be (mobile) radio systems or any other suitable wireless data transmission systems, for example. The cited vehicles may be cars, trucks, motor cycles, rail vehicles, ships or airplanes, for example.

Besides the system described here, an appropriate method for updating a digital map for a driver assistance system in a vehicle is furthermore also proposed. This method accordingly provides for the use of a base station and a plurality of vehicles that are each equipped with a driver assistance system. At least one transmission unit of the base station is used to send updated map data with updated attributes to the driver assistance systems. Each of the driver assistance systems uses a memory unit to store the map data for at least one portion of the digital map and uses a receiver unit to receive the updated map data sent by the base station. Next, each of the driver assistance systems uses a control unit in the driver assistance system and uses the received updated map data to update the respectively stored map data.

The method furthermore involves each of the driver assistance systems using a position finding unit to determine coordinates of the vehicle and sending these coordinates to the base station using a transmission unit. The transmission unit receives the coordinates using a receiver unit and stores them using a memory unit. A computation unit in the base station is used to select, for each of the subregions, those of the stored coordinates of the vehicles that are situated within the subregion, and these selected stored coordinates of the vehicles are used to update the attributes of this subregion.

The possible embodiments and further developments that are described above in connection with the system and are also specified in the dependent claims can be transferred to the proposed method accordingly. Accordingly, the suitabilities and advantageous effects of the system can also be transferred to the proposed method.

BRIEF DESCRIPTION OF THE DRAWINGS

The system proposed here and the method proposed here are explained below using a specific exemplary embodiment that is shown schematically in FIGS. 1 and 2, in which.

DETAILED DESCRIPTION OF THE DRAWINGS

Figure 1:
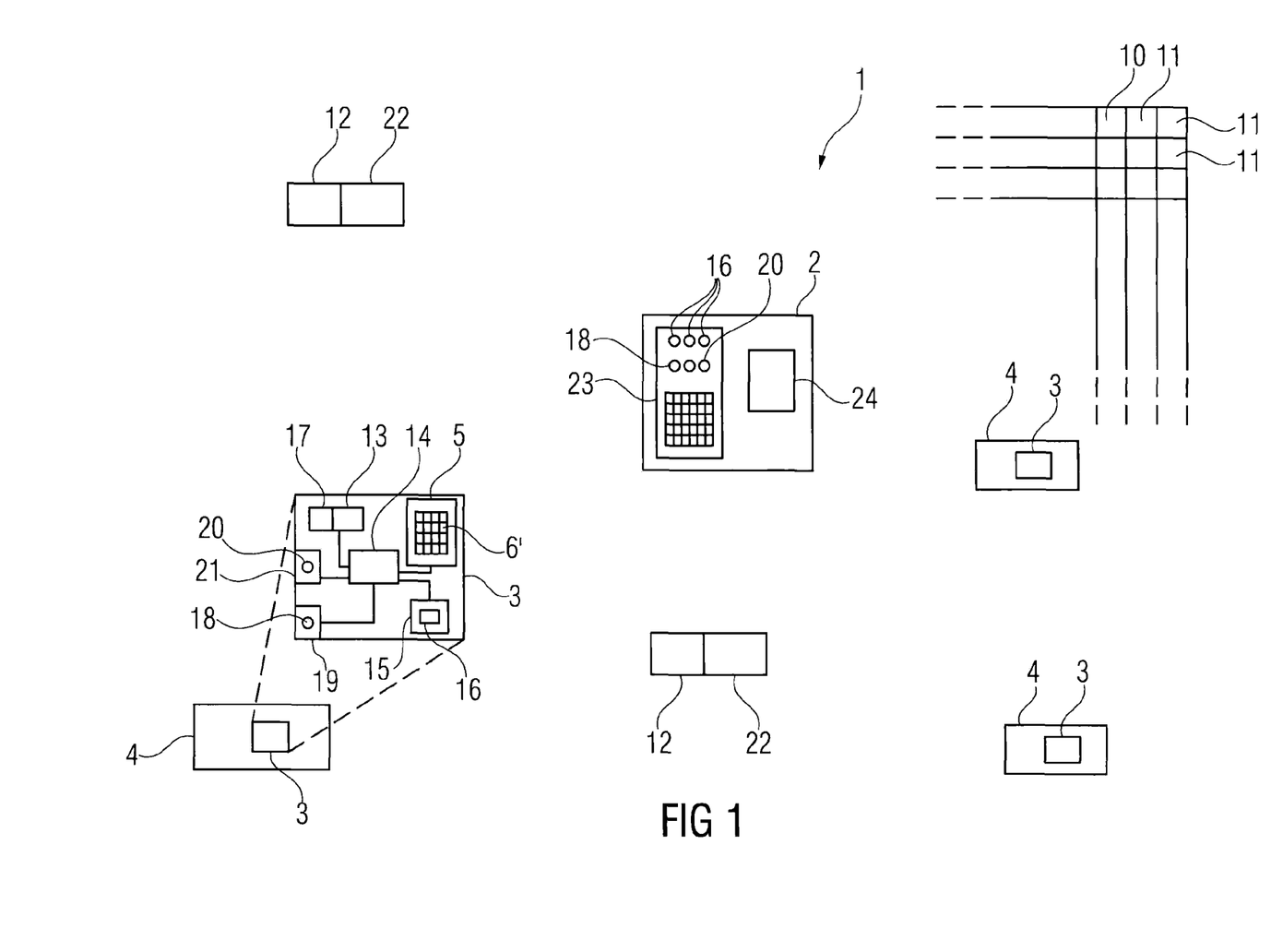
FIG. 1 is a system of the type proposed here for updating a digital map.

FIG. 1 shows a system 1 of the type proposed here with a base station 2 and a multiplicity, for example 10,000 or more, of vehicles 4 that are each equipped with a driver assistance system 3. Each driver assistance systems 3 comprises a memory unit 5 for storing at least one portion 6' of a digital map 6.

Figure 2:
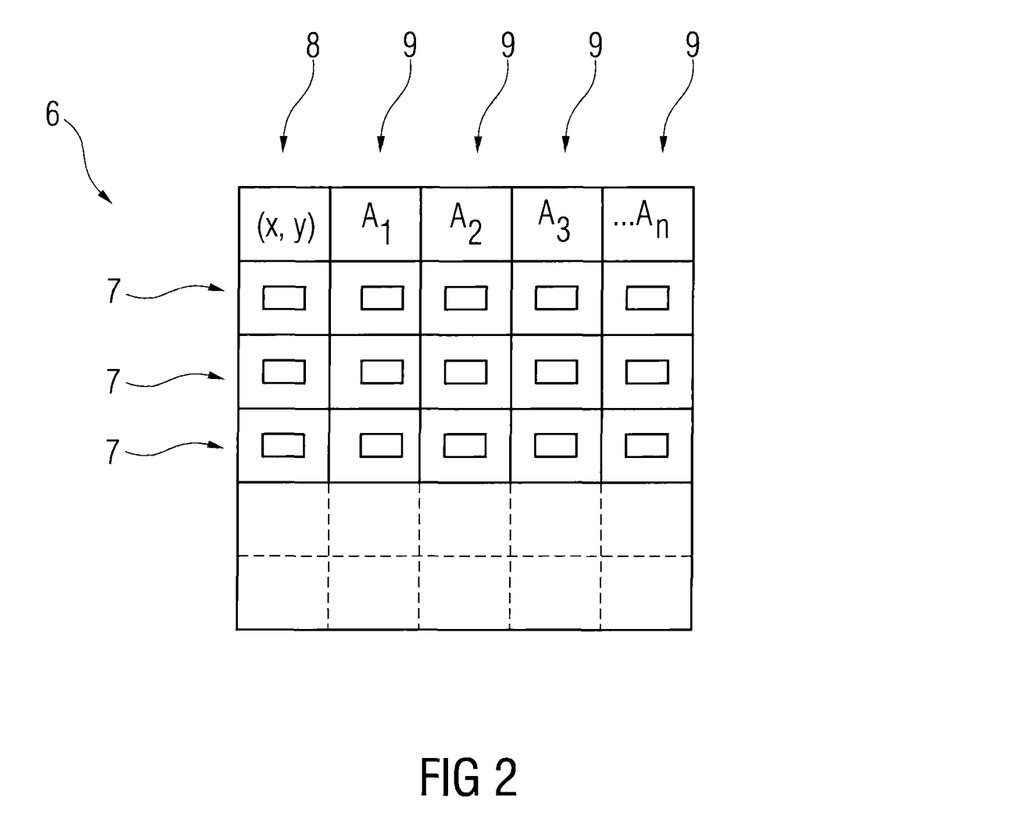
FIG. 2 is a schematic illustration of a detail from a digital map.

As schematically shown in FIG. 2, the digital map 6 contains map data 7 for characterizing subregions 11 of an overall region 10 depicted by the digital map 6. For each of these subregions 11, the digital map 6 contains precisely one map data item 7, which comprises coordinates 8 of this subregion 11 and one or more attributes 9 that characterize this subregion 11 in more detail and that are provided by numbers, letters, and Boolean operators. In this example, the subregions 11 are defined by uniform rasterization of the overall region 10 and have an area of one square meter. Instead of coordinates 16, it is also possible to use the start and end of a link between two points as characterization of the subregion 11.

The base station 2 comprises a plurality of transmission units 12, which are distributed over the overall region 10, for sending updated map data 7 for the digital map 6 to the driver assistance systems 3. In this case, the updated map data 7 comprise not only the coordinates 8 or the connections between two points but also, in particular, updated attributes 9.

Each of the driver assistance systems 3 comprises a receiver unit 13 for receiving the updated map data 7 sent by the base station 2 and a control unit 14 for updating the stored map data 7 using the received updated map data 7 by overwriting the stored map data 7 with the updated map data 7 received from the base station 2. Each of the driver assistance systems 3 has a position-finding unit 15 for ascertaining current coordinates 16 of the vehicle 4. These coordinates 16 define the current position of the vehicle 4. By way of example, the position finding-unit 15 may be a navigation receiver for receiving locating signals from satellites (for example GPS, Galileo, GLONASS, COMPASS, IRNSS etc.), from WLAN systems, from cellular radio systems, or from other locating signal transmitters.

Furthermore, each of the driver assistance systems 3 comprises a transmission unit 17 for sending the current coordinates 16 and also further data produced by the driver assistance system 3, such as measurement data 18 from ambient sensors 19 and driving-dynamics measurement data 20 from a further sensor system 21 in each of the driver assistance system 3 (see below), to the base station 2. The control unit 14 is set up to actuate the transmission unit 17 to send the coordinates 16 and further data 18, 20 produced by the respective driver assistance system 3 to the base station 2. By way of example, this actuation can take place at regular intervals of time, these intervals of time being able to be in a range from 1 second to 10 seconds, for example. In addition or alternatively, it is also possible for this actuation always to take place as soon as the vehicle 4 has moved on by a particular distance, this distance being able to be in a range between 1 meter and 10 kilometers, for example. In addition or alternatively, it is also possible for this actuation to take place automatically within each of the cited subregions 11 at least once.

The base station 2 comprises a plurality of receiver units 22, which are distributed over the overall region 10, for receiving the data 16, 18, 20 sent by the vehicles 4 and a memory unit 23 for storing the received data 16, 18, 20 from the vehicles 4. The vehicles 4 are recorded in the base station 2, with a registration mark being stored in the memory unit 23 for each of the vehicles 4 and each of the vehicles 4 recorded in this manner sending an appropriate registration (counter)mark together with the current coordinates 16, 18, 20 to the base unit.

Furthermore, the base station 2 comprises a computation unit 24 that is set up to select, for each of the subregions 11 of the overall region 10, those of the stored coordinates 8 of the vehicles 4 that are associated with this subregion 11 and to update the attributes 9 of the subregion 11 (and hence the map data item 7 for this subregion 11) using the coordinates 8 selected in this manner. Furthermore, the computation unit 24 may be set up also to use and to take into account the data transmitted by the driver assistance systems 3, in each case together with the coordinates 16, namely the measured variables 18 from the ambient sensors 19, the driving-dynamics measured variables 20 from the sensor systems 21 and/or results from checks on the attributes 9 of the stored portion 6' of the digital map 6 (see below), when updating the attributes 9.

The cited ambient sensors 19 in the vehicles 4 are set up to capture measured variables 18 or attributes 9 that characterize the current surroundings 11 of these vehicles 4. The ambient sensors 19 used are camera systems, radar sensors, lidar sensors, laser scan systems, ultrasound sensors, ESC sensor systems, vehicle-to-X communication units (C2X), and the like. These ambient sensors 19, which are each connected to the control unit 14 of the respective driver assistance system 3 for the purpose of data transmission, are used to capture, inter alia, the current lane of the traffic route in which the vehicle 4 is currently situated and also further attributes of this lane, such as the direction of travel and turn-off opportunities, the type, the road surface and the current weathering-dependent state of the current traffic route.

Furthermore, the control units 14 of the driver assistance systems 3 are set up to use the current coordinates 16 of the respective vehicle 4 to check the map data 7 stored for these coordinates 16 of the vehicle 4, that is to say particularly the attributes 9 of the stored portion 6' of the digital map 6, and to send the result of this check together with the coordinates 16 to the base station 2. The computation unit 24 of the base station 2 is set up to take these results received from the driver assistance systems 3 into account when producing the updated attributes 9. The update to the relevant attributes 9 is initiated by the computation unit 24 on condition that a minimum number of deviations of a prescribed threshold value have arisen during these checks.

As attributes, the map data item 7 from each of the subregions 11 of the overall region 10 depicted by the digital map 6 contains, inter alia:
association of the subregion 11 with a traffic network, articularly a road network;
association of the subregion 11 with a traffic route in the traffic network, particularly a road;
association of the subregion 11 with a traffic lane on the traffic route;
curvature and/or curve of the traffic route, for example defined by the radius of curvature of the traffic route;
lane information from the traffic route, particularly lane direction, lane change options, and/or turn-off options;
presence of an obstruction within the subregion 11, particularly presence of roadwork, closure, detours, and/or a current deviation in the course of the traffic route from an original course of the traffic route; and/or
type, nature and/or current state of the traffic route, particularly of a negotiable surface of the traffic route, for example asphalt, cobblestones, gravel, unsecured, wet, snow-covered, icy, etc.

The driving-dynamics measured variables 20 from the vehicle 4 that are able to be captured by the sensor systems 12 in the vehicles 4 include, inter alia:
speed of the vehicle 4;
longitudinal acceleration of the vehicle 4;
transverse acceleration of the vehicle 4;
vertical acceleration of the vehicle 4;
rev counts for the engine and/or for one, a plurality of or all the wheels of the vehicle 4;
steering wheel angle of the vehicle 4;
side slip angle of the vehicle 4;
yaw rate of the vehicle 4;
roll rate of the vehicle 4;
pitch rate of the vehicle 4;
slippage of the wheels of the vehicle 4;
coefficient of friction of the wheels of the vehicle 4; and
energy consumption of the vehicle 4.

The driver assistance systems 3 are set up to send these driving-dynamics measured variables 20, together with the current coordinates 16 of the respective vehicle 4, to the base station 2. The computation unit 24 of the base station 2 may be set up to use the received driving-dynamics measured variables 20 and the coordinates 16 (that are current during the capture of the measured variables 18) of the vehicles 4 when updating the attributes 9 associated with the coordinates 16.

Each of the driver assistance systems 3 is set up to use the current driving-dynamics measured variables 20 to independently check the stored attributes 9 associated with the current coordinates 16 of the respective vehicle 4 and to send the result of this check to the base station 2. The computation unit 24 of the base station 2 is set up to take into account and use these results received from the vehicles 4 when updating the attributes 9. In this case, the update to the relevant attributes 9 is initiated by the computation unit 24 on condition that a minimum number of deviations above a prescribed threshold value has arisen during these checks.

The driving-dynamics measured variables 20 from the individual vehicles 4 are used as a basis for the computation unit 24 of the base station 2 to define, produce, and calculate further attributes 9 of the digital map 6. The map data item 7 from each of the subregions 11 contains, inter alia, the following attributes 9 that characterize this subregion 11:
a statistical distribution function for one or more of the driving-dynamics measured variables 20 of the vehicles 4 in this subregion 11, particularly a speed distribution and/or acceleration distribution for the vehicles 4 within the subregion 11,
a statistical measured variable, derived from a statistical distribution function for one or more driving-dynamics measured variable of the vehicles 4 in this subregion 11, such as the mean, the median, the standard deviation, the minimum and/or the maximum of the driving-dynamics measured variable, or the correlation of the driving-dynamics measured variables 20, particularly an average speed of the vehicles 4 within this subregion 11,
a functional relationship between a plurality of the driving-dynamics measured variables 20, particularly between the speed and the transverse acceleration of the vehicle 4 in this subregion 11,
a typical driving style of the vehicles 4 in this subregion 11, particularly a sporty driving style (for example existing in the case of great accelerations and/or speeds) or a uniform driving style (for example existing in the case of only small accelerations and moderate speeds); and
an average energy consumption of the vehicles 4 within the subregion 11.

The computation unit 24 of the base station 2 is then set up to calculate this at least one attribute based on driving-dynamics measured values by using the driving-dynamics measured variables 20 received from the vehicles 4 for each of the relevant subregions 11 as indicated above. In this case, the computation unit 24 may be set up to compare the received driving-dynamics measured values with one another and in so doing to identify individual outliers. For the further calculation of the attributes, these outliers can be ignored and only the remainder of the measured values, which are therefore validated, can be used.

By way of example, a suitable statistical distribution function is a standard normal distribution with the characteristic variables mean and variance. Alternatively, a histogram having 7 classes, for example, can also be used.

The functional relationship between the driving-dynamics characteristic variables is preferably presented as a family of characteristic curves so as not to obtain any restriction as a result of a preselected functional representation. Alternatively, it is also possible to use polynomials, for example of $3^{rd}$ degree, and to transmit the support points therefor, including parameters.

Furthermore, the driver assistance systems 3 of the vehicles 4 are set up to send, inter alia, the following features that characterize the respective vehicle 4:
vehicle 4 type;
vehicle 4 weight;
type of propulsion for the vehicle 4 (drive axle, four-wheel drive);
type of tires on the vehicle 4 (e.g. winter tires or summer tires);
type of motorization of the vehicle 4 (e.g. type of energy, performance, etc.); and
average energy consumption of the vehicle 4,
to the base station 2. The computation unit 24 of the base station 2 is set up to update the attributes 9 of the digital map 6 by taking into account these features that characterize the vehicles 4. In this case, energy is understood to mean both conventional fuel (petrol, diesel, ethanol) and electrical power from batteries or fuel cells, as well as hydrogen and other modern energy sources.

Thus, by way of example, the attributes of the map are calculated and updated separately for different values of these vehicle features: the average coefficient of friction and the average speed of a road section, in each case including information about the statistical distribution, for example in the form of a variance about the mean, are calculated from the relevant driving-dynamics measured values 20 of the vehicles 4 by taking into account the tires and also the driving style of the individual vehicles 4.

In addition to the aforementioned features that characterize the vehicles 4, the update to the attributes 9 of the digital map 6 also involves, inter alia, the following features that characterize the drivers of the vehicles 4:
age of the driver;
sex of the driver; and
driving style of the driver (e.g. sporty, defensive, etc.).

These features are the drivers sent to the base station 2. The computation unit 24 of the base station 2 is set up to update the attributes 9 of the digital map 6 by taking these features of the drivers into account. Thus, by way of example, the driving style and/or the age of the drivers are taken into account when calculating the speed distribution and the average fuel consumption within the subregions 11 by calculating separate speed distributions and energy consumption means and distributions for different age groups and driving styles.

The computation unit 24 of the base station 2 is also set up to individually determine the time ("time stamp") of the update to each of the attributes 9 of each of the subregions 11 by the computation unit 24 and to actuate the transmission units 12 of the base station 2 to send these times together with the updated attributes 9 to the driver assistance systems 3. The control units 14 of the driver assistance systems 3 are set up to use these times to determine the currentness of the attributes and take this currentness of the attributes 9 as a basis for deciding whether the attributes 9 are admissible for the use of particular driver assistance functions. By way of example, safety-critical functions may require greater currentness than less safety-critical functions. A warning about excessive speed when approaching a curve could lead to brake intervention, for example, when very current data are available and could just be left as a warning when the data are older than a prescribed threshold value.

The control units 14 of the driver assistance systems 3 are set up to automatically determine the type, scope and time of the updated map data 7 required by the base station 2 by using the current coordinates 16 of the vehicle 4, the features of the driver and the features of the vehicle 4, current driving-dynamics measured variables 20 (such as the current speed of the vehicle 4), current measured values 18 from the ambient sensors 19 (for example the weathering-dependent state of the road or the number of lanes) and other inputs from the driver, and to send an appropriate request signal to the base station 2. The computation unit 24 of the base station 2 is set up to transmit the updated map data 7 to the respective driver assistance systems 3 by taking into account the request signals received from the driver assistance systems 3. In particular, this means that a given vehicle 4 is sent only such map data 7 that characterizes immediate surroundings of the vehicle 4, the radius of these surroundings being determined on the basis of the current speed.

Alternatively, or additionally, the computation unit 24 of the base station 2 could be set up to use the current coordinates 16 of the vehicle 4, the features of the driver, the features of the vehicle 4, the current driving-dynamics measured values from the sensor system and/or the current measured values from the ambient sensors 19 and/or other inputs from the driver to select, for each of the vehicles 4, the type, scope, and/or time of the attributes suitable for the vehicle 4 and to send only these attributes to the vehicle 4.

Furthermore, the control units 14 of the driver assistance systems 3 are set up to perform driver assistance functions by using the map data 7 for the digital map 6 and send recommendations or warning messages to the drivers of the vehicles, for example using the updated map data, and/or furthermore automatically send control signals to controllable systems in the vehicle 4, such as to the brake system, the engine, the lighting system, the chassis, etc.

The reception units 13, 22 and transmission units 12, 17 of the driver assistance systems 3 and the base station 2 are mobile radio systems in the present example. The vehicles 4 are cars, trucks and motor cycles in the present case.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A system that updates a digital map of a driver assistance system in a vehicle, wherein the digital map contains map data having coordinates and attributes characterizing subregions of an overall region depicted by the digital map, wherein the system comprises:
   a base station; and
   a plurality of vehicles, each vehicle having a driver assistance system having:
      a memory configured to store map data from at least a portion of the digital map;
      a receiver configured to receive updated map data; and
      a control unit configured to update the stored map data using the received updated map data;
      a navigation receiver configured to ascertain coordinates of the vehicle; and
      a transmitter configured to send the coordinates of the vehicle to the base station;
   the base station having:
      at least one base station transmitter configured to send the updated map data having updated attributes to the receiver of the driver assistance systems;
      a base station receiver configured to receive the coordinates of the vehicles;
      a base station memory configured to store the coordinates of the vehicles; and
      a computation unit configured to select, for each of the subregions, those of the stored coordinates of the vehicles that are situated within the subregion, and to use these stored coordinates of the vehicle to update the attributes of this subregion,
   wherein each of the subregions is defined as a single square grid segment, each subregion covering a uniform area of the overall region defined by the digital map,
   wherein at least one of the vehicles has a respective sensor system configured to capture at least one driving dynamics measured variable from the vehicle, the sensor system being connected to the driver assistance system of the vehicle and transmitting the at least one driving dynamics measured variable,
   wherein each driver assistance system is configured to send the at least one driving dynamics measured variable together with the coordinates of the vehicle to the base station,
   wherein the computation unit of the base station is configured to update the attributes of the digital map using at least the received driving dynamics measured variables and the coordinates of the vehicles, the received driving dynamics measured variables and the coordinates of the vehicles being validated against one another and processed using statistical data evaluations by the computation unit of the base station, and to transmit the updated attributes of the digital map to the driver assistance systems of the vehicles,
   wherein the driver assistance systems are configured to actively engage in controlling the respective vehicles in which the driver assistance systems are located, based on the updated attributes of the digital map received from the base station,
   wherein the computation unit of the base station is configured to determine a time of the update of each of the attributes by the computation unit and to actuate the base station transmitter to send the times when each of the attributes were updated by the computation unit together with the updated attributes to the driver assistance systems, and
   wherein the time of the update of each of the attributes is used to determine whether the attributes are admissible for a particular driver assistance function of the driver assistance systems.

2. The system as claimed in claim 1,
   wherein at least one of the control units is configured to use the coordinates of the respective vehicle to check the attributes of the digital map that are stored for these coordinates of the vehicle and to send a result of this check to the base station,
   wherein the computation unit of the base station updates the attributes based at least in part on the result.

3. The system as claimed in claim 2,
   wherein the map data contains one or more attributes comprising:
      association of the subregion with a traffic network,
      association of the subregion with a road network,
      association of the subregion with a traffic route in the traffic network,
      association of the subregion with a road,
      association of the subregion with a traffic lane on the traffic route,
      curvature of the traffic route,
      curve of the traffic route lane information from the traffic route, including at least one selected from the group consisting of lane direction, lane change options, and turn off options,
      presence of an obstruction within the subregion, including at least one selected from the group consisting of presence of roadwork, closure, diversion in the course of the traffic route from an original course of the traffic route, and a current deviation in the course of the traffic route from an original course of the traffic route,
      type of the traffic route,
      nature of the traffic route and
      current state of the traffic route,
      current state of a negotiable surface of the traffic route.

4. The system as claimed in claim 1,
wherein a plurality of or all the vehicles have a respective sensor system configured to capture at least one driving dynamic measured variable from the vehicle, the respective sensor system connected to the driver assistance system of the vehicle to transmit the at least one driving dynamics measured variable,
wherein each of the respective driver assistance systems uses the driving dynamics measured variables to check stored attributes associated with the coordinates of the vehicle and to send the result of this check to the base station,
wherein the computation unit of the base station is configured to update the attributes of the digital map using the results received from these vehicles for checks on the attributes.

5. The system as claimed in claim 1, wherein the at least one driving dynamics measured variable from the vehicle captured by the sensor system of the vehicle is at least one selected from the group consisting of:
speed of the vehicle,
longitudinal acceleration of the vehicle,
transverse acceleration of the vehicle,
vertical acceleration of the vehicle,
rev counts for an engine of the vehicle,
rev counts for one wheels of the vehicle,
rev counts for a plurality of or all the wheels of the vehicle,
steering wheel angle of the vehicle,
side slip angle of the vehicle,
yaw rate of the vehicle,
roll rate of the vehicle,
pitch rate of the vehicle,
slippage of the wheels of the vehicle,
coefficient of friction of the wheels of the vehicle, and
energy consumption of the vehicle.

6. The system as claimed in claim 1, wherein the map data from each of the subregions contains at least one attribute characterizing the subregion comprising:
a statistical distribution function for one or more of the driving dynamics measured variables of the vehicles in this subregion, particularly a speed distribution and/or acceleration distribution for the subregion,
a statistical measured variable, derived from a statistical distribution function for at least one driving dynamic measured variables of the vehicles in this subregion, comprising at least one of a mean, a median, a standard deviation, a minimum and/or a maximum of the driving dynamics measured variable or a correlation of the driving dynamics measured variables, particularly an average speed of the vehicles in this subregion,
a functional relationship between a plurality of the driving dynamics measured variables;
a functional relationship between the speed and transverse acceleration of the vehicles within the subregion,
a typical driving style of the vehicles in this subregion, particularly a sporty driving style or a uniform driving style,
an average energy consumption of the vehicles within the subregion,
wherein the computation unit of the base station is configured to update this at least one attribute by using the driving dynamics measured variables received from the vehicles for each of the subregions.

7. The system as claimed in claim 1,
wherein the driver assistance systems of the vehicles are configured to send to the base station at least one feature characterizing the vehicle comprising:
vehicle type,
vehicle weight,
propulsion type of the vehicle,
type of tires on the vehicle,
type of motorization of the vehicle,
average energy consumption of the vehicle,
wherein the computation unit of the base station is configured to update the attributes of the digital map by taking this feature into account.

8. The system as claimed in claim 1,
wherein a plurality of the driver assistance systems of the vehicles are configured to send at least one feature characterizing a driver comprising
age of the driver,
sex of the driver,
driving style of the driver,
to the base station,
wherein the computation unit of the base station is configured to update the attributes of the digital map based at least in part on the at least one feature of the driver.

9. The system as claimed in claim 1,
wherein the control units of a plurality of the driver assistance systems are configured to automatically determine at least one selected from the group consisting of a type, scope and time of the updated map data required by the base station, using at least one selected from the group consisting of current coordinates of the vehicle, a driving style of a driver, a current speed of the vehicle and inputs from the driver, and to send an appropriate request signal to the base station,
wherein the computation unit of the base station is configured to transmit the updated map data to the driver assistance systems based at least in part on request signals received from the driver assistance systems.

10. A method for updating a digital map for a driver assistance system in a vehicle, wherein the digital map contains map data having coordinates and attributes for characterizing subregions of an overall region depicted by the digital map, wherein a plurality of vehicles each have a driver assistance system having a memory, comprising:
storing at least one portion of the map data by each of the memories;
receiving, by receivers in the driver assistance systems, updated map data having updated attributes to the driver assistance systems from at least one base station transmitter;
updating the map data stored in the respective memory of the driver assistance systems by the control units of the driver assistance systems using the received updated map data;
ascertaining coordinates for each of the vehicles using a navigation receiver in the driver assistance system of each of the vehicles;
sending the coordinates to the base station by a transmitter in each of the driver assistance systems;
receiving the coordinates by the base station using a receiver in the base station;
storing the coordinates using a memory in the base station;
selecting the stored coordinates of the vehicles that are situated within the subregion for each of the respective subregions by a computation unit in the base station; and updating the attributes of the subregion using the selected stored coordinates of the vehicles, wherein each of the subregions is defined as a single square grid segment, each subregion covering a uniform area of the overall region defined by the digital map, wherein at least one of the vehicles has a respective sensor system each respective sensor system capturing at least one driving dynamics measured variable from the vehicle, the sensor system connected to the driver assistance system of the vehicle transmitting the at least one driving dynamics measured variable, wherein each driver assistance system sends the at least one driving dynamics measured variable together with the coordinates of the vehicle to the base station, wherein the computation unit of the base station updates the attributes of the digital map using at least the received driving dynamics measured variables and the coordinates of the vehicles, the received driving dynamics measured variables and the coordinates of the vehicles being validated against one another and processed using statistical data evaluations by the computation unit of the base station, and transmits the updated attributes of the digital map to the driver assistance systems of the vehicles, wherein the driver assistance systems actively engage in controlling the respective vehicle in which the driver assistance systems are located, based on the updated attributes of the digital map received from the base station, wherein the computation unit of the base station is configured to determine a time of the update of each of the attributes by the computation unit and to actuate the base station transmitter to send the times when each of the attributes were updated by the computation unit together with the updated attributes to the driver assistance systems, and wherein the time of the update of each of the attributes is used to determine whether the attributes are admissible for a particular driver assistance function of the driver assistance systems.

* * * * *